G. H. METCALF.
COMBINED HARROW AND PLANTER.
APPLICATION FILED DEC. 31, 1910.

990,061.

Patented Apr. 18, 1911.
2 SHEETS—SHEET 1.

Witnesses

Inventor
George H. Metcalf
By Victor J. Evans
Attorney

G. H. METCALF.
COMBINED HARROW AND PLANTER.
APPLICATION FILED DEC. 31, 1910.
990,061.
Patented Apr. 18, 1911.
2 SHEETS—SHEET 2.
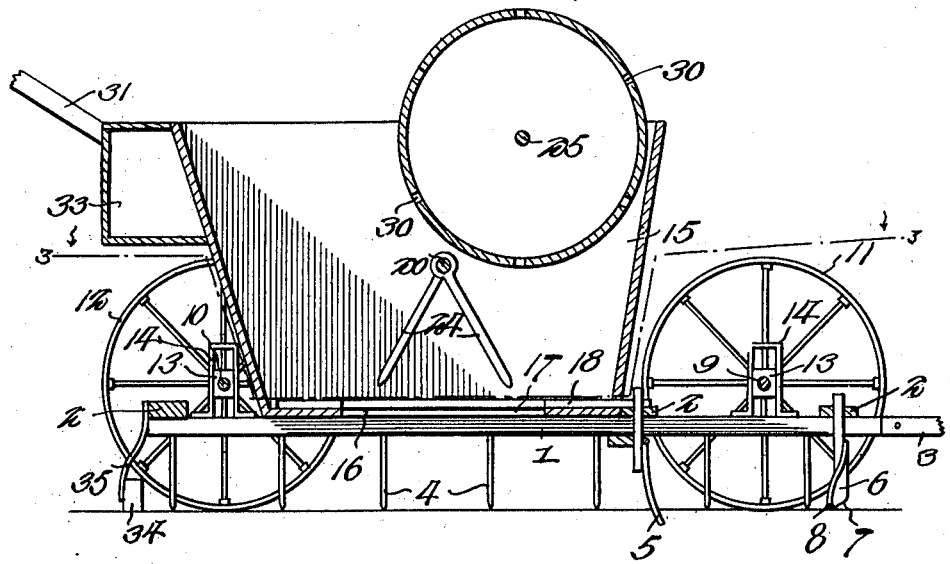
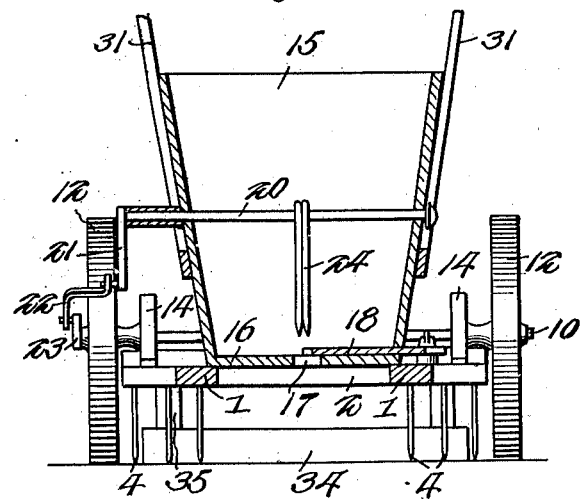
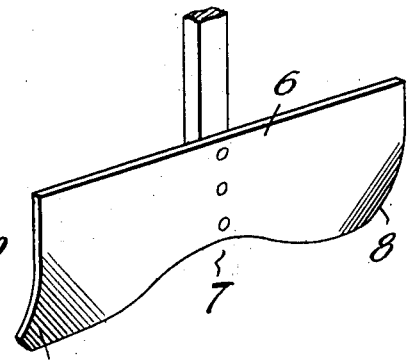
Witnesses
Inventor
George H. Metcalf
By Victor J. Evans
Attorney

UNITED STATES PATENT OFFICE.

GEORGE H. METCALF, OF WILKINSON, MISSISSIPPI, ASSIGNOR OF ONE-HALF TO WILLIAM E. WISNER, OF WILKINSON, MISSISSIPPI.

COMBINED HARROW AND PLANTER.

990,061.    Specification of Letters Patent.    Patented Apr. 18, 1911.

Application filed December 31, 1910. Serial No. 600,245.

*To all whom it may concern:*

Be it known that I, GEORGE H. METCALF, a citizen of the United States of America, residing at Wilkinson, in the county of Wilkinson and State of Mississippi, have invented new and useful Improvements in Combined Harrows and Planters, of which the following is a specification.

This invention relates to a combined harrow and seed planter, and it has for its object to produce a simple and efficient implement by the use of which by a single operation a furrow will be opened, seed deposited therein and covered, and the soil be stirred and agitated and the clods broken so as to leave the seed in the best possible condition for germinating.

With these and other ends in view which will readily appear as the nature of the invention is better understood, the same consists in the improved construction and novel arrangement and combination of parts which will be hereinafter fully described and particularly pointed out in the claim.

In the accompanying drawings has been illustrated a simple and preferred form of the invention, it being, however, understood that no limitation is necessarily made to the precise structural details therein exhibited, but that changes, alterations and modifications within the scope of the claim may be resorted to when desired.

Figure 1:
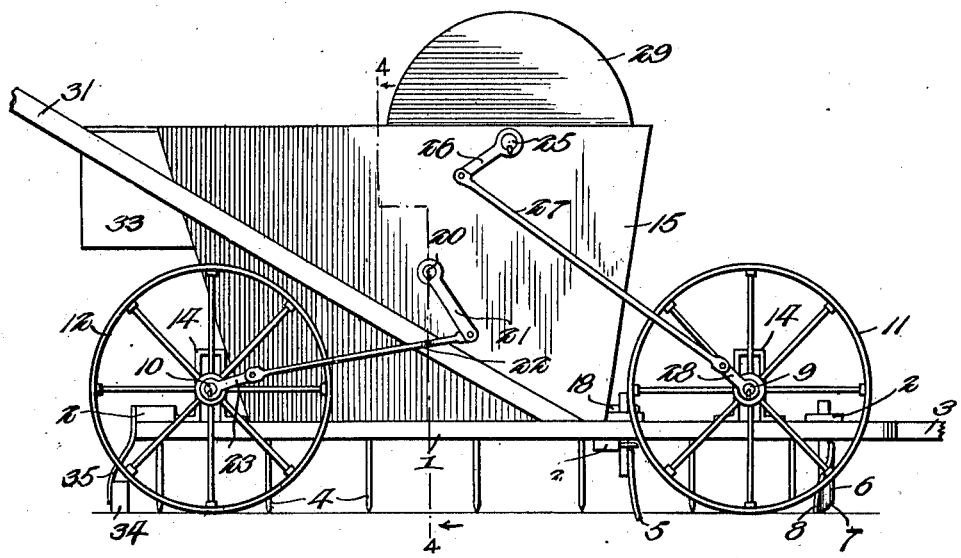
Figure 3:
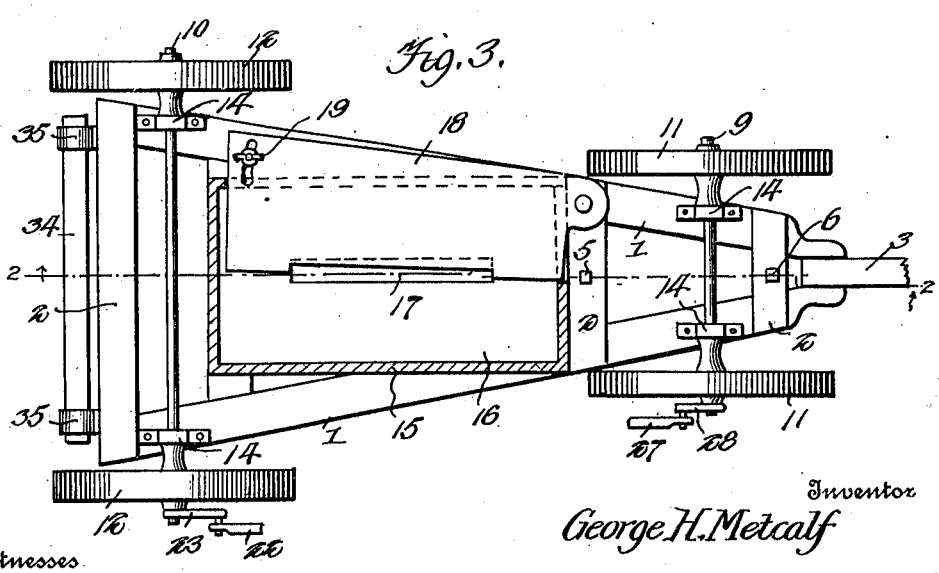

In the drawings, Figure 1 is a side elevation. Fig. 2 is a longitudinal vertical sectional view taken on the plane indicated by the line 2—2 in Fig. 3. Fig. 3 is a horizontal sectional view taken on the line 3—3 in Fig. 2. Fig. 4 is a transverse sectional view taken on the line 4—4 in Fig. 1. Fig. 5 is a perspective detail view of the clod scraper.

The frame of the machine includes two sills or side members 1, 1 that converge in a forward direction, said sills being connected at various points between their front and rear ends by cross bars 2, 2. The front ends of the sills afford bearings for a shaft 3 with which a draft member, such as a tongue or a cross bar carrying thills or shafts may be pivotally connected. The sills and cross bars are provided with downwardly extending harrow teeth 4, and one of the cross bars is equipped with a furrow opener 5. At the front of the frame is also supported a downwardly extending blade 6 which is provided with a V-shaped notch 7 and with rearwardly curved side flanges 8. This blade constitutes a scraper by means of which trash will be cleared away in advance of the furrow opener and thrown toward the sides of the machine so as not to interfere with the operation of the furrow opener or harrow teeth and enabling the soil to be operated upon to the best advantage. The sills or side members of the frame are provided with bearings for revolving front and rear axles 9, 10 carrying transporting wheels 11, 12. The axles are supported for rotation in boxes 13 that are vertically adjustable upon standards or supports 14 in order to enable the frame to be raised or lowered so as to dispose the harrow teeth at the proper elevation to engage the ground to the requisite depth.

The frame supports a seed box or hopper 15 the bottom of which, 16, has a slot or opening 17, the size of which may be regulated by means of a slide 18 for the adjustment of which a set screw 19 is provided. Supported for oscillation in the seed box is a rock shaft 20 having at one end a crank 21 which is connected by a pitman 22 with a crank 23 upon the rear axle 10. The rock shaft 20 is provided within the box or hopper with one or more arms or agitators 24 for the purpose of agitating the contents of the box to expel it through the slot or opening 17.

Supported for oscillation in the upper forward portion of the hopper 15 is a rock shaft 25 having a crank 26 which is connected by a pitman 27 with a crank 28 upon the front axle 9 whereby when the machine is in operation the shaft 25 will be rocked or oscillated. The shaft 25 carries a seed box or drum 29 having apertures 30 through which the contents of said drum will escape when the drum is oscillated to be subsequently expelled through the slot in the bottom of the seed box.

The machine is equipped with handles 31 whereby it may be guided. The frame supports a tool box 33 which may also be used for carrying an extra sack of seed. A coverer 34 is supported upon spring arms 35 extending downwardly and rearwardly from the sills or side members of the frame.

In the operation of this machine, the blade 6 serves to clear the clods and trash away from the path of the furrow opener, the surface of the soil being left to present a ridge in the most favorable condition for the operation of the furrow opener and for the reception of the seed. By bearing down upon or depressing the handles, the front end of the machine may be tilted upwardly, thus lifting the front wheels from the ground and temporarily suspending the operation of the seed drum, thus suspending the seed dropping operation when obstacles are encountered or when for any reason it shall be found desirable to do so.

This machine, as will be seen is simple in construction, and it has been found thoroughly efficient for the purposes for which it is provided.

Having thus described the invention, what is claimed as new, is:—

In a machine of the character described, a frame having a furrow opener and coverer, front and rear axles for said frame, bearings for the axles, cranks upon said axles, a hopper supported upon the frame, a rock shaft supported transversely in said hopper and having a crank, a pitman connecting said crank with the crank upon the front axle, a seed drum upon the rock shaft, an agitator shaft supported for oscillation transversely in the hopper, a crank upon said agitator shaft, a pitman connecting said crank with the crank upon the rear axle, and handles connected with the frame and the hopper, whereby said frame may be tilted to elevate the front wheels from the ground.

In testimony whereof I affix my signature in presence of two witnesses.

GEORGE H. <span>his<br>×<br>mark</span> METCALF.

Witnesses:
   LYT. LEWIS,
   R. J. MCNEIL.

---

Copies of this patent may be obtained for five cents each, by addressing the "Commissioner of Patents, Washington, D. C."